(12) United States Patent
Greubel

(10) Patent No.: US 7,044,643 B2
(45) Date of Patent: May 16, 2006

(54) ROTARY BEARING WITH LUBRICANT PASSAGE ARRANGEMENT, AND THREADED DRIVE WITH ROTARY BEARING-SUPPORTED THREADED NUT

(75) Inventor: Roland Greubel, Ramsthal (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 10/682,594

(22) Filed: Oct. 9, 2003

(65) Prior Publication Data

US 2004/0071376 A1 Apr. 15, 2004

Related U.S. Application Data

(62) Division of application No. 10/079,013, filed on Feb. 19, 2002.

(30) Foreign Application Priority Data

Feb. 19, 2001 (DE) ................. 101 07 706

(51) Int. Cl.
*F16C 19/00* (2006.01)
*F16H 27/02* (2006.01)

(52) U.S. Cl. ............... 384/475; 384/462; 384/474; 74/89.44; 184/5

(58) Field of Classification Search ............. 384/462, 384/465, 467, 470, 473, 474, 475; 74/89.44, 74/89.43; 184/5
See application file for complete search history.

(56) References Cited

U.S. PATENT DOCUMENTS 3,064,758 A * 11/1962 Ohrnberger ............ 184/6.12
3,885,842 A * 5/1975 Furutsu .................. 384/468
5,253,733 A * 10/1993 Miyachi .................. 184/6.26
5,320,433 A * 6/1994 Kimata et al. ........... 384/473
5,362,159 A * 11/1994 Kufner et al. ........... 384/484
5,484,213 A    1/1996 Caillaut et al.
5,642,946 A * 7/1997 Caillault et al. ........ 384/486
5,803,616 A * 9/1998 Persson et al. ........... 384/473
5,809,838 A * 9/1998 Miyaguchi et al. ...... 74/89.44
6,152,606 A * 11/2000 Shirosaki et al. ......... 384/558
6,227,713 B1 * 5/2001 Neder et al. ............. 384/484
6,428,212 B1 * 8/2002 Tanaka .................... 384/475

FOREIGN PATENT DOCUMENTS

| GB | 2323132 A | * | 9/1998 |
| JP | 54-3640 | * | 1/1979 |
| JP | 2-209624 | * | 8/1990 |
| JP | 5-164127 | * | 6/1993 |

* cited by examiner

*Primary Examiner*—Richard W. Ridley
*Assistant Examiner*—Colby Hansen
(74) *Attorney, Agent, or Firm*—MIchael J. Striker

(57) ABSTRACT

A rotary bearing has a first lubricant passage having one end which opens in an inner peripheral surface of a radially outer bearing part and another end which is connectable with a lubricant supply, at least one second lubricant passage which leads from an outer peripheral surface of a radially inner bearing part to an inner peripheral surface of the radially inner bearing part, and a ring chamber between the outer bearing part and the inner bearing part, in which the first lubricant passage and the second lubricant passage open the ring chamber, and a lubricant distributing element formed as a separate part arranged on the ring chamber, and is in a lubricant supplying connection with at least one lubricant passage, and outflow paths including a first outflow path for supplying lubricant to the engaging surfaces of the bearing parts, and a second outflow path for supplying lubricant through the second lubricant passage to a further lubricating point.

17 Claims, 3 Drawing Sheets

ROTARY BEARING WITH LUBRICANT PASSAGE ARRANGEMENT, AND THREADED DRIVE WITH ROTARY BEARING-SUPPORTED THREADED NUT

CROSS REFERENCE TO A RELATED APPLICATION

This application is a division of patent application Ser. No. 10/079,013 filed on Feb. 19, 2002.

BACKGROUND OF THE INVENTION

The present invention relates to a rotary bearing with a lubricant passage arrangement for supplying a lubricant both to engaging surfaces of a radially inner bearing part and a radially outer bearing part of a rotary bearing, and also to at least one further lubricating point.

The radially inner bearing part and the radially outer bearing part are rotatable relative to one another about an axis of the rotary bearing, and the lubricant passage arrangement includes at least one first lubricant passage with one end which opens into the inner peripheral surface of the radially outer bearing part and another end which is connectable with a lubricant supply, and a second lubricant passage which leads from the outer peripheral surface, of the radially inner bearing part leads to its inner peripheral surface and a ring chamber which is formed between the inner peripheral surface of the outer bearing part and the outer peripheral surface of the inner bearing part, with the first lubricant passage and the at least one second lubricant passage open in the ring chamber. Such a rotary bearing is disclosed for example in German patent document DE 195 19 770 A1.

A threaded spindle of a roller body threaded drive for a machine table is conventionally supported rotatably in a machine bed, and a threaded nut is fixedly connected with the machine table. When the machine table must move with a high speed along the threaded spindle, a correspondingly high rotary speed of the threaded spindle around its axis is required. The spindle rotary speed and thereby also a traveling speed of the machine table are however limited from above by the bending-critical rotary speed of the threaded spindle. For this reason at high machine table-traveling speeds frequently a construction with the fixedly arranged threaded spindle and rotatably arranged threaded unit is selected, as disclosed for example in the German patent document DE 195 19 770 A1.

In the embodiments shown in this patent the radially outer bearing part of the rotary bearing is formed as a special component fixedly connectable with the machine table, and furthermore the thread turns of the threaded nut of the threaded drive are provided on a radially inner peripheral surface of the radially inner bearing part. In other words the radially inner bearing part and the threaded part are formed of one piece with one another. As can be easily seen, for an orderly operation of the threaded drive disclosed in the document DE 195 19 770 A1 both lubrication of engaging surfaces between the radially outer and the radially inner bearing part is required, and also lubrication of the engaging surfaces between the threaded spindle and the threaded nut.

In order to provide the lubrication centrally from a stationary component which performs at least a rotary movement, the embodiments shown in the documents DE 195 19 770 A1 are united through a lubricant passage arrangement with a central lubricating supply point. A first lubricant passage extends from a central lubricant supply point with one end which opens at the inner peripheral surface of the radially outer bearing part in a ring chamber. The ring chamber is arranged between the radially outer and the radially inner bearing part and thereby can supply the engaging surfaces of both bearing parts with lubricant in a simple manner. For supplying the further lubricating point, namely the engaging points between the threaded nut and the threaded spindle, a second lubricant passage is provided which extends through the inner bearing part from its outer peripheral surface to its inner peripheral surface. The lubricant can be supplied from the radially inner end of this second lubricant passage in a simple manner to the engaging surface between the threaded nut and the threaded spindle.

In order to influence the lubricant distribution between the lubrication of the engaging surface of the rotary bearing and lubrication of the engaging surfaces between the threaded spindle and the threaded nut, the document DE 195 19 770 A1 discloses the embodiments shown in FIGS. 10, 11, and 12 with throttle elements at the inner peripheral surface of the radially outer bearing part and/or the outer peripheral surface of the radially inner bearing part. Depending on the properties of the lubricant to be used (lubricant grease or lubricant oil of different viscosity), a differently designed inner and outer bearing parts must be provided. This significantly limits the applications of the individual rotary bearings or individual threaded drives with rotary bearing-supported threaded nut, or a plurality of such a rotary bearings or threaded drives with rotary bearing-supported threaded nuts are needed.

SUMMARY OF THE INVENTION

Accordingly, it is an object of the present invention to provide a rotary bearing, in particular for a threaded drive with a rotary bearing-supported threaded nut, which avoids the disadvantages of the prior art.

More particularly, it is an object of the present invention to provide a rotary bearing, in particular for a threaded drive with a rotary bearing-supported threaded nut, which provides an efficient flexible adaptation of the rotary bearing or the threaded to the respective application conditions in particular the properties of the lubricant to be used.

In keeping with these objects and with others which will become apparent hereinafter, one feature of the present invention resides, briefly stated, in a rotary bearing of the above mentioned general type, in which in the ring chamber a lubricant distributing element is arranged as a special component, which is in a lubricant-supply connection with the at least one first lubricant passage, wherein at least one first outflow path is provided in and/or on the lubricant distributing element to supply lubricant to the engaging surfaces of the rotary bearing and wherein at least one second outflow path is provided in and/or on the lubricant supplying element, in order to supply lubricant through the at least one second lubricant passage to the at least one further lubricating point.

In accordance with the present invention the radially inner and the radially outer bearing parts can be formed as standard components. They however have to limit a ring chamber, so that the lubricant distributing element can be arranged in it as a separate component.

The lubricant distributing element defines a lubricant supply path whose throughgoing resistance for the lubricant can be selected in dependence on the desired lubricant distribution. In order to provide adaptation to the corresponding application conditions, in particular to the lubricant to be used, in accordance with the present invention it is sufficient to arrange the corresponding lubricant distributing element in the ring chamber of the standard rotary bearing.

When it is stated here that the lubricant distributing element "defines" the outflow paths, these means that these outflow paths singly and alone are formed by the lubricant distributing element, in particular are formed on it, for example in form of conveying openings whose diameter throttles the lubricant throughflow. Alternatively, the throttling action which controls the lubricant distribution can be provided by outflow paths which are formed between the lubricant distributing element and the surrounding wall surfaces, in particular of the ring chamber. Finally, it is also possible that one of the outflow path is formed throttlingly in the above mentioned manner, while the other outflow path does not provide any throttling resistance to the lubricant throughflow, but the lubricant is supplied to a throttling lubricant passage formed in one of the bearing parts of the rotary bearing.

When before or after for example the expressions "lubricant passage" or "outflow path" are utilized, this does not have to be construed as a limitation of the claims, but instead serves just for simplification of the explanation. In particular components which rotate around the axis can be associated with a plurality of corresponding types of lubricant passages of outflow paths, to guarantee a continuous lubricant supply.

The lubricant distribution element can be formed for example as a synthetic plastic component, in particular an injection molded part.

In a preferable embodiment of the invention, the lubricant distributing element can have a substantially U-shaped cross-section with two side legs and a connecting transverse web. At least one supply opening can be provided for example in the transverse web for supplying lubricant from the at least one first lubricant passage into the inner chamber of the lubricant distributing element which is limited by the transverse web and the both side legs of the U-shaped structure.

As explained above the first outflow path can be formed for example partially between one outer surface of the lubricant distributing element extending substantially orthogonal to the axial direction, and a counter surface of the ring chamber which also extends substantially orthogonal to the axial direction. This embodiment is especially recommended when the ring chamber is formed as a peripheral groove in the inner peripheral surface of the radially outer bearing part or/and the outer peripheral surface of the radially inner bearing part. The radius of the beginning of the surfaces, their distance, the length of the passage formed by these surfaces, and the viscosity of the lubricant, to mention just a few influences, determines the throughgoing resistance of the first outflow path.

The second outflow path can be formed for example so that the at least one second lubricant passage opens into the inner chamber of the lubricant distributing element. In this previously described case, the second outflow path does not contribute or only contribute insignificantly to throttling of the lubricant flow to the further lubricating point. Moreover, the flow resistance of the lubricant cloud leading to the further lubricant point is practically determined exclusively by the flow resistance of the second lubricant passage.

In accordance with a further embodiment of the present invention it is proposed to fix the lubricant distributing element on the radially outer bearing part, for example by means of at least one securing element, and in particular preferably both in an axial direction and in a circumferential direction. In a further embodiment of this variant of the invention, the securing element is formed by a pipe which is received in the first lubricant passage and engages in a securing depression provided on the outer periphery of the lubricant distributing element, wherein a bottom surface of the securing depression has a supply opening which leads to an inner chamber of the limit lubricant distributing element. It has the advantage that no additional openings which can influence the outer appearance of the rotary bearing must be provided for insertion of securing pins in the peripheral surface of the radially outer bearing part.

A radially inner end of the above mentioned pipe can engage in a portion of a stepped opening of the lubricant distributing element, which has a wider diameter. This stepped opening can form the supply opening of the lubricant distributing element, so that through the pipe and the stepped opening lubricant can be supplied into the inner chamber of the lubricant distributing element.

In a further embodiment of the present invention it is proposed to form the lubricant distributing element as a lubricant distributing ring. The term "ring" is to be understood within the full range of its meaning and it is not limited only to a full ring extending over a whole peripheral length. In particular also split rings can be utilized. Also, the construction of the full ring is preferable both from operational and manufacturing reasons.

For example in order to arrange the lubricant distributing element in a simple manner in a peripheral groove of the inner bearing part, in accordance with a further embodiment of the present invention, the radially inner bearing part has two bearing part bodies which abut against one another with axial end surfaces. It is advantageous from manufacturing point of view, for example higher number of parts and lower prices, and from the point of view of bearing hole, when the both bearing part bodies are identical and mirror-symmetrical.

When in particular the radially inner bearing part of the inventive rotary bearing is not formed of one piece with the component on which the further lubricant point is arranged, or in other words contrary to the embodiments shown in the patent document DE 195 19 77 A1 it is not formed of one piece with the threaded nut of the threaded drive, it is advantageous when a ring groove is provided on the inner peripheral surface of the radially inner bearing part and extends preferably substantially over the whole periphery. It is then not necessary during the mounting of this component in the radially inner bearing part to pay attention to a predetermined relative orientation in the peripheral direction. It is further sufficient when the lubricant passages provided in this further component open into the ring groove. It is to be understood that additionally or alternatively a further such ring groove can be provided on the peripheral surface of the further component, or in other words for example on the threaded nut.

The inventive rotary bearing can be formed for example as a roller bearing and preferably as a roller bearing with at least two rows of rolling bodies spaced from one another in an axial direction. It is further advantageous when the load lines of the both rolling body rows enclose an acute angle with the axis, and the load lines of the both roller body rows form preferably an O-arrangement in a section which contains the axis. In other words it is advantageous when a two-row inclined rolling body bearing is used in the O-arrangement.

The tilting safety of the inventive rotary bearing around a turning axes which extends orthogonally to the rotary bearing axis can be improved when the axial distance between both rolling body rows is smaller than the diameter of the rolling bodies rows, preferably smaller than 0.8 time, but preferably amounts to at least 0.5 times of this diameter, for example substantially 0.3 times of this diameter. The same tilting safety is possible when the rotary bearing is formed axially shorter, as for example for the known roller bearings in the document DE 195 19 770 A1. The axial distance between both roller bearing rows is measured from a roller body center to a roller body center of two roller bodies located in the same peripheral position. Analogously this is also true for the diameters of the roller body rows. Since this embodiment variants improve the properties of the inventive roller bearing independently from providing of a special lubricant distributing element, for this variance a separate protection is sought.

The both roller body rollers can have a diameter of for example substantially 65 mm. Moreover, it is advantageous when the roller bodies are guided in the roller body cages and are held there. Finally, the roller bodies can be formed as balls, rollers, and the like.

The present invention deals also with a threaded drive with a threaded spindle, a threaded nut which threadingly engages with the threaded spindle, and a rotary bearing with a radially inner bearing part and a radially outer bearing part which are rotatable relative to one another about an axis of the roller bearing and radially limit a ring chamber, a lubricant passage arrangement for supplying lubricant both to the engaging surfaces of the rotary bearing and also to the engaging surfaces of the threaded spindle and the threaded nut, wherein the lubricant passage arrangement has at least one first lubricant passage with one end opening at the inner peripheral surface of the outer bearing part in the ring chamber and with another end connectable with a lubricant supply, and a second lubricant passage which leads to the outer peripheral surface of the inner bearing part from the ring chamber, wherein the threaded nut and the radially inner bearing part of the roller bearing are formed as separate components and which during the mounting of the threaded drive are mountable on one another, and wherein in the threaded nut at least one third lubricant passage is formed which is in a lubricant-supply connection with the second lubricant passage.

This threaded drive is different from the threaded drives disclosed in the document DE 195 19 770 A1 first of all in that the threaded nut and the radially inner bearing part of the rotary bearing as formed as separate components. This simplifies the manufacture of the threaded drive since for providing a threaded drive with rotatable threaded nuts both for the manufacture of the rotary bearing and also for the manufacture of the threaded drive itself, the separate conventional techniques can be utilized and no compromise for the manufacture of the threaded nut or the radially inner bearing part of the rotary bearing must be made.

It is to be understood that in this threaded drive preferably the above described rotary bearing can be utilized, so that with respect to further modifications the explanations of the inventive rotary bearing can be dispensed with.

Lubricant oil can be preferably used as a lubricant for high rotary speeds or traveling speeds of the machine table. However, the lubricating grease is not excluded as well.

In accordance with a further aspect of the invention, a threaded drive is proposed which includes a spindle with a spindle axis, a nut which is in a threaded engagement with a spindle, a rotary bearing with two bearing parts which are centrally arranged with one another relative to the spindle axis and are rotatable relative to one another around the spindle axis and limit a ring chamber therebetween, with the radially inner bearing part connected or connectable non- rotatably with the nut, and a lubricant supplying system for supplying the bearing engaging surfaces of both bearing parts and the threaded engaging surfaces of the spindle and the nut with lubricant, wherein at least one lubricant supplying path of the lubricant supplying system which is supplied from a lubricant source with lubricant leads through the radially outer bearing part to the ring chamber and there branches into at least two branching paths, from which at least one first branching path leads into the ring chamber to at least one part of the bearing engaging surfaces and the at least one second branching path leads through the radially inner bearing part to the at least one part of the threaded engaging surfaces.

In accordance with the present invention in such a threaded drive it is provided that the at least one of the two branching paths has a controllable throttling point.

The provision of the controllable throttling point allows a control of the feed of lubricant to the bearing engaging surfaces and/or the threaded engaging surfaces.

In particular, by changing the opening cross-section of the throttling point the ratio between lubricant quantities fed through the both outflow paths can be influenced. For this purpose, it is especially advantageous when the throttling point is formed as a controllable blocking point, which is adjustable between an opening position in which it provides the throughflow of lubricant and a closing position in which the throughflow of lubricant is substantially interrupted. In this way it is possible when necessary to provide the lubricant feeding at least temporarily completely in one of the outflow paths. This can be especially advantageous when a post lubricant consumption takes place only on the bearing engaging surfaces or only on the threaded engaging surfaces.

Preferably the opening cross-section of the throttling point is controllable in dependence on the lubricant pressure in the lubricant supply path, in particular with the use of lubricating grease as a lubricant, so that in a simple manner via the lubricant pressure in the lubricant supply path the ratio of the lubricant quantities can be determined which are supplied to the bearing engaging surfaces and the threaded engaging surfaces. In practice it has been shown that the lubricant consumption at the threaded engaging surfaces is frequently greater than at the bearing engaging surfaces. As a result the lubricant supply for lubrication of the threaded engaging surfaces can be already used up, while for lubrication of the bearing engaging surfaces in the first outflow path lubricant is still available. When then a post filling of the lubricant supply system with fresh lubricant is performed, it is desired that this fresh lubricant predominantly is supplied or exclusively is supplied into the second outflow path to avoid an oversupply of the bearing engaging surfaces.

In a preferable embodiment of the invention for the controllable throttling point, the throttling point is arranged in the first outflow path and its opening cross-section is smaller at a higher lubricant pressure in the lubricant supply branch and is greater at a lower lubricant pressure.

For realization of throttling point, the radially outer bearing part can carry a ring tongue which is provided at the inner peripheral side, extends into the ring chamber and is flexibly deflectable. The throttling point is formed between one of the tongue side surfaces and a throttle limiting surface formed on the outer peripheral side of the radially inner bearing part, and the ring tongue limits the lubricant supply path at its opposite tongue side surface. Depending on how high is the lubricant pressure in the lubricant supply path, in this embodiment the ring tongue is deviated more or less to the throttle limiting surface, which corresponds to a greater or smaller narrowing of the throttling point. The ring tongue can be produced of the same material with the outer bearing part as a one piece. Alternatively, it can be formed separately from the outer bearing part. In particular the ring tongue can be formed by one of the U legs of the lubricant distributing ring which has an approximately U-shaped cross-section, as described above. Each of the legs of this distributing ring can form a flexible ring tongue. It is to be understood that the aspect of the controllable throttling point is not dependent on whether the nut is formed of one piece with the radially inner bearing part or is formed as a separate component.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
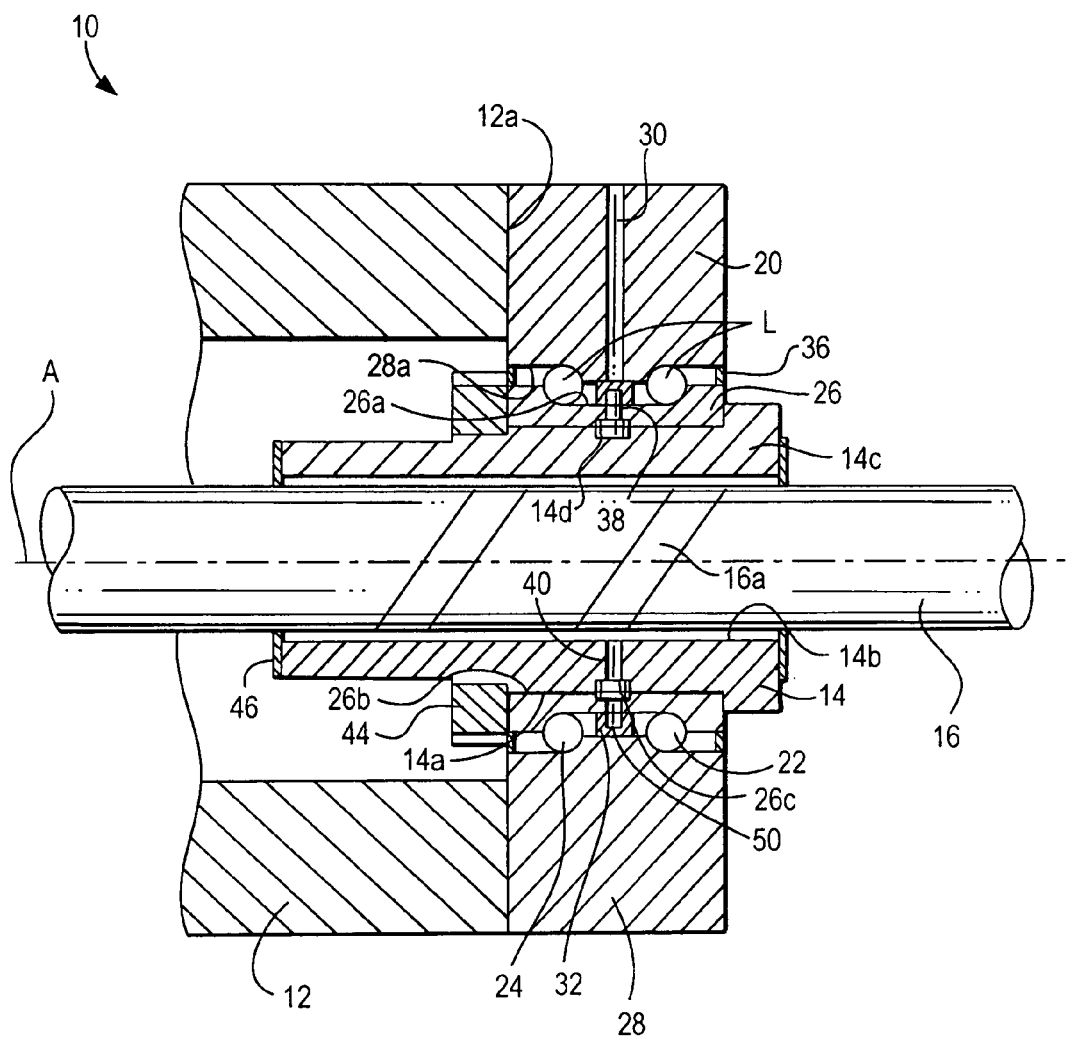
FIG. 1 is a section side view of a threaded drive provided with a rotary bearing in accordance with the present invention.
Figure 2:
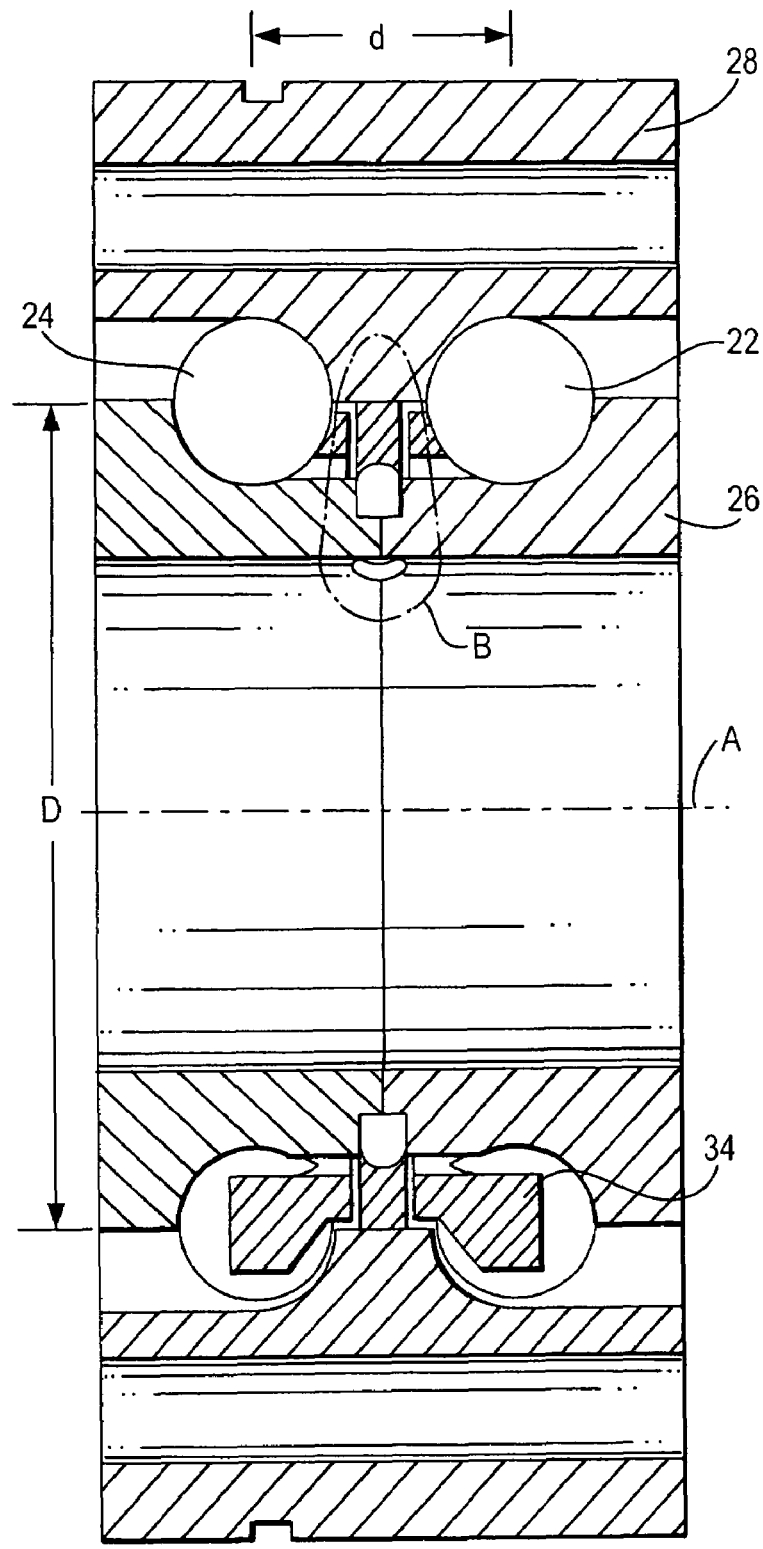
FIG. 2 is an enlarged view of the rotary bearing of FIG. 1 in accordance with the present invention.
Figure 3:
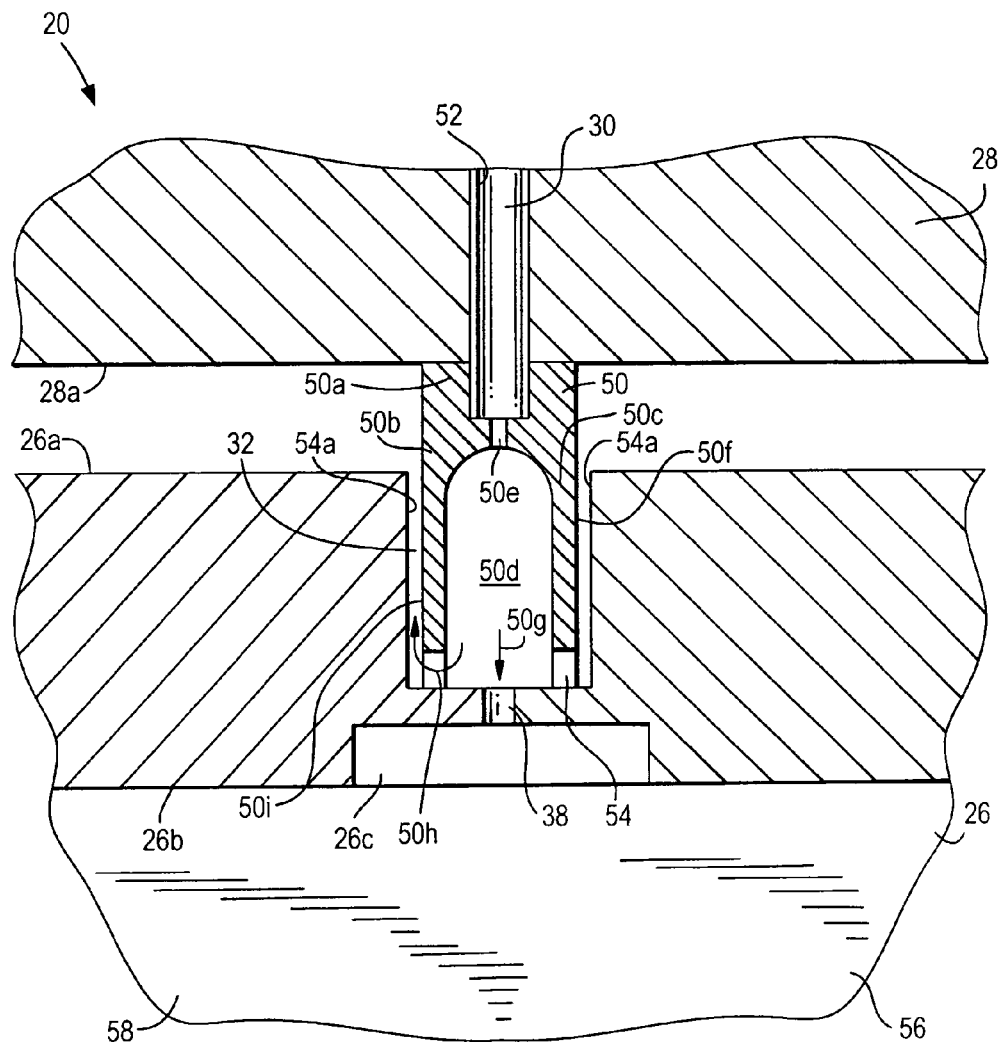
FIG. 3 is an enlarged view of a region B shown in FIG. 1 of the inventive rotary bearing.

It should be noted that the roller bearings shown in FIGS. 1–3 do not completely coincide with one another in scale or details, but instead are different from one another by some details.

FIG. 1 shows an inventive threaded drive which is identified as a whole with reference numeral 10. The threaded drive serves for displacement of a machine table 12 in direction of the axis A. The machine table 12 can be for example a part of a conventional linear guiding arrangement, with which it is displaceably guided along a not shown guiding rail or in a not shown guiding housing in direction of the axis A. As will be explained in detail herein below, the threaded drive 10 is a threaded drive with a rotatably supported threaded nut 14. A threaded spindle 16 is in threaded engagement with the threaded nut 14 in particular through a roller bearing which can be formed by balls. The threaded spindle 16 is non-rotatably arranged on two end plates of the guiding rail or the guiding housing. The roller bearing running tracks of the threaded spindle 16 are shown schematically in FIG. 1 and identified with reference 16a.

For rotatably supporting the threaded nut 14, a rotary bearing 20 is mounted on an end surface 12a of the machine table 12. It is mounted for example with screw pins which are shown schematically and identified with dash-dot lines. The rotary bearing 20 in the shown embodiment is formed as a ball bearing, and in particular as a two-row inclined ball bearing in an O-arrangement. In other words the load lines of the both ball rows 22 and 24 extend with respect to the axis A under a not insignificant, acute angle and form in the cross-section of FIG. 1 the shape of an O.

As shown in particular in FIG. 2, the diameter D of the both roller body rows 22 and 24 is greater than the distance d between the ball rows 22 and 24 measured in direction of the axis A. The distance d amounts preferably at most 0.8 times preferably higher than 0.5 times, and preferably 0.3 times of the diameter D. This has the advantage, in particular in connection with the O-arrangement that a higher tilting safety of the radially inner bear part 26 is provided relative to the radially outer bearing part 26 about tilting axes extending orthogonal to the rotary axis A.

A first lubricant passage 30 is formed in the radially outer bearing part 28 of the roller bearing 20. A lubricant nipple or another suitable device for supplying lubricant is arranged at the radially outer end of the lubricant passage 30 or connected to it. The radially inner end of the first lubricant passage 30 opens into a ring chamber 32 which is enclosed by the inner peripheral surface 28a of the radially outer bearing part 28, the outer peripheral surface 26a of the radially inner bearing part 26, and the roller bodies of both roller body rows 22 and 24. Since the roller bodies preferably is guided in a roller bearing cages 34 and in some cases are held there, as can be seen from FIG. 2, the lubricant passes between the roller bodies and is supplied to the axial end surfaces of the both bearing parts 26 and 28. An undesirable leak of lubricant is there prevented by seals 36 shown in FIG. 1.

With the supply of lubricant through the first lubricant passage 30 into the ring chamber 32, a reliable lubrication of the roller bodies of both roller body rows 22 and 24 and the running paths provided for them on the radially outer bearing part 28 and the radially inner bearing part 26 is guaranteed.

In order to ensure that the lubricant supply through the first lubricant passage 30 also lubricates the engaging surfaces of the threaded drive itself, or in other words the engaging surfaces of the threaded nut and the threaded spindle 16, a second lubricant passage 38 extends in the shown embodiment in the radially inner bearing part 26 in a radial direction. More particularly, the lubricant passage 38 extends from the ring chamber 32, or in other words from the outer peripheral surface 26a of the radially inner bearing part, to its inner peripheral surface 26b. Furthermore, this second lubricant passage 38 is in lubricant flow connection with a third lubricant passage 40. The third lubricant passage 40 extends radially through the threaded groove 14. In particular, the third lubricant passage 40 opens into the inner peripheral surface 14b of the threaded nut 14, in which also the engaging surfaces for the counter engaging surfaces of the threaded spindle 16 are formed. In particular, the helically extending running tracks for the roller bearing of at least one roller bearing circulation provided between the threaded nut and the threaded spindle 16.

In the embodiment shown in FIG. 1, the threaded nut 14 is provided at its right end with a shoulder 14c. When it passes through the lumen of the radially inner bearing part 26 it narrowly abuts against the radially inner bearing part 26 and can be secured in a simple way by a counter nut 44. In order not to provide a precise peripheral orientation of these both parts during mounting of the threaded nut 14 and the radially inner bearing part 26 to ensure a lubricant overflow between the second lubricant passage 38 and the third lubricant passage 40, a circumferential groove 26c is formed on the inner peripheral surface 26b of the radially inner bearing part 26 and extends in a peripheral direction, and a circumferential ring groove 14d is provided on the radially outer peripheral surface 14a of the threaded nut 14. The lubricant supply from the ring chamber 32 to the engaging surfaces of the threaded drive 14/16 is performed through the second lubricant passage 38 of the both ring grooves 26c and 14d and the third lubricant passage 40.

In order to avoid special seals between the radially inner bearing part 26 and the threaded nut 14, it is recommended to produce these parts with matching fit. For reliable lubricant throughflow connection between the second lubricant passage 38 and the third lubricant passage 40 it is sufficient to provide either the ring groove 26c only in the inner peripheral surface 26b of the radially inner bearing part 26, or only in the outer peripheral surface 14a, or to provide the peripheral groove 14d only in the outer peripheral surface 14a of the threaded nut 14. Furthermore, it is believed to be clear that seals 46 are provided on the axial ends of the threaded groove 14, which reliably prevent a leakage of lubricant.

In order to influence the distribution of the lubricant supplied through the first lubricant passage 30 to the both lubricant points in a desired manner, namely the engaging surfaces between the radially inner bearing part 26 and the radially outer bearing part 28 on the one hand and the engaging surface between the threaded nut 14 and the threaded spindle 16 on the other hand, a lubricating distributing ring 50 is provided in the ring chamber 32 between the both bearing points 26 and 28. Its construction and operation will be explained herein below with reference to FIG. 3.

The lubricant distributing 50 has a substantially U-shaped construction in a cross-section as shown in FIG. 2, with a base web 50a and two side legs 50b and 50c. The U-shape defines an inner chamber 50d which communicates with the first lubricant passage 30 through a supply opening 50e which is formed as a stepped opening. A lubricant supply pipe 52 is inserted in the first lubricant passage 30 and engages with its radially inner end into the portion of the stepped opening 50e with a greater diameter. In this way the lubricant distributing ring 50 can be axially fixed by the lubricant supply part 52 both in direction of the axis A and in the peripheral direction on the radially outer bearing part 28. Furthermore, the outer diameter of the lubricant distributing ring 50 corresponds to the inner diameter of the outer bearing part 28, so that a radial movement between the lubricant distributing ring 50 and the radially outer bearing part 28 is prevented.

The lubricant distributing ring 50 is open at its radially inner end, so that its inner chamber 50d freely communicates with the second lubricant passage 38. Its diameter in connection with the further flow steps 26c, 14d and 40 determine the flow resistance for the supply of lubricant to the engaging surfaces of the threaded nut 14 and the threaded spindle 16.

The flow resistance for the supply lubricant to the engaging surfaces 26a and 28a of the bearing parts 26,28 and the both ball rows 22 and 24 is determined by cooperation of portions of the axial end surfaces 50i and 50f with counter surfaces 54a of a ring groove 54 of the radially inner bearing part 26. Since this flow resistance depends significantly from the width of the flow paths 50i/54a, 50f/54a formed between both end surfaces, the axial fixation of the lubricant distributing ring 50 by the lubricant supply part 52 is especially important.

In this way the radially inwardly open end of the U-shape of the lubricant distributing ring 50 forms a lubricant outflow path 50g which leads to the engaging surfaces of the threaded nut 14 and the threaded spindle 16, while it forms in connection with the end surface paths 50i/54a, 50f/54a an outflow path 50h which leads to the engaging surfaces of the both bearing points 26, 28.

Furthermore, the radially inner bearing part 26 of FIG. 3 is formed of two mirror-symmetrically arranged, and otherwise identically formed bearing part halves 56 and 58. This makes possible the insertion of the lubricant distributing ring 50 into the ring groove 54 without problems.

It has been indicated that the lubricant distributing ring 50 is formed as a component which is separate from the radially outer bearing part 26 and is secured by the supply pipe 52 on the outer bearing part 28. Alternatively it is possible that the lubricant distributing means 50 is produced of one piece and with an uninterrupted material connection with the outer bearing part 28, for example by an injection molding or a pressure casting process. In particular, in the case of such a material-interrupted manufacture of the outer bearing part 28 with the lubricant distributing ring 50, the manufacture is advantageous since not only the inner part 26 but also the unit of the outer bearing part 28 and the distributing ring 50 can be produced from separate, mirror-symmetrical halves.

Furthermore, it is preferable when the U legs 50b, 50c of the distributing ring 50 have a certain elasticity so that they form flexibly deflectable tongues. The tongues at least in the region of their free ends which adjoin the base of the ring groove 54 are pressable on the counter surfaces 54a of the ring groove 54 and are pressable against them. The throttling points which are formed between the end surfaces 50e, 50f of the distributing ring 50 and the counter surfaces 54a of the ring groove 54 can have a reduced cross-section in this manner and in some cases can be completely closed. If a viscous to pasteous lubricant grease is pressed as a lubricant through the first lubricant passage 30 into the roller bearing 20, the grease accumulating in the inner chamber 50d of the distributing ring 50 presses the U-legs 50b, 50c against one another. As a result the filling grease is not supplied or is supplied only in a very reduced quantity to both outflow paths 50h extending right and left at the distributing ring 50. Instead it is supplied almost exclusively through the second lubricant passage 38 to the engaging surfaces between the threaded nut 14 and the threaded spindle 16.

When the pressure of the lubricant grease lowers in the inner chamber 50d of the distributing ring 50 the U legs 50b, 50c can again turn back to their initial position, so that the outflow paths 50h return to their initial opening width. Then grease can further flow from the inner chamber 50 to the roller bearing rows 22, 24 and the associated roller paths at the bearing part 26, 28. The timely blocking of the outflow paths 50h has the advantage that thereby an overflow supply of the roller bearing 20 with lubricant grease is prevented. Such excessive grease after a certain time can be pressed outwardly namely through the seals 36. The incorporation of the controllable throttling points in the outflow paths 50h prevents leakage losses.

It will be understood that each of the elements described above, or two or more together, may also find a useful application in other types of constructions differing from the types described above.

While the invention has been illustrated and described as embodied in rotary bearing with lubricant passage arrangement, and threaded drive with rotary bearing-supported threaded nut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

The invention claimed is:

1. A rotary bearing, comprising a radially inner bearing part and a radially outer bearing part rotatable relative to one another about an axis; a lubricant passage arrangement for supplying a lubricant both to engaging surfaces of said radially inner bearing part and said radially outer bearing part and also to a further lubricating point, said lubricant passage arrangement including at least one first lubricant passage having one end which opens in an inner peripheral surface of said radially outer bearing part and another end which is connectable with a lubricant supply, at least one second lubricant passage which leads from an outer peripheral surface of said radially inner bearing part to an inner peripheral surface of said radially inner bearing part, and a ring chamber between said inner peripheral surface of said outer bearing part and said outer peripheral surface of said inner bearing part, said at least one first lubricant passage and said at least one second lubricant passage opening in said ring chamber; a lubricant distributing element formed as a separate part which is arranged in said ring chamber, said lubricant distributing element being in a lubricant supplying connection with said at least one first lubricant passage; means forming at least one first outflow path associated with said lubricant distributing element for supplying lubricant to the engaging surfaces of said bearing parts, and means for providing at least one second outflow path associated with said lubricant distributing element for supplying lubricant through said at least one second lubricant passage to said at least one further lubricating point, wherein said first outflow path is formed between an outer surface of said lubricant distributing element which extends substantially orthogonal to an axial direction and a counter surface of said ring chamber whit extends also substantially orthogonal to the axial direction.

2. A rotary bearing as defined in claim 1, wherein said at least one outflow path is arranged so as to be located at a location selected from the group consisting of in said lubricant distributing element, on said lubricating distributing element, and both.

3. A rotary bearing as defined in claim 1, wherein said at least one second outflow path is arranged so as to be located at a location selected from the group consisting of in said lubricant distributing element, on said lubricating distributing element, and both.

4. A rotary bearing as defined in claim 1, wherein said lubricant distributing element has a substantially U-shaped cross-section with two side legs and a connecting transverse web.

5. A rotary bearing as defined in claim 4, wherein said side legs and said transverse web together limit an inner space of said lubricant distributing element, said transverse web having at least one supply opening through which lubricant is supplied from said at least one first lubricant passage into said inner space of said lubricant distributing element.

6. A rotary bearing as defined in claim 1, wherein said at least one second outflow path is formed so that said at least one second lubricant passage opens into said inner space of said lubricant distributing element.

7. A rotary bearing as defined in claim 1, and further comprising at least one securing element which secures said lubricant distributing element with respect to said radially outer bearing part.

8. A rotary bearing as defined in claim 7, wherein said securing element secures said lubricant distributing element relative to said radially outer bearing part both in an axial direction and in a peripheral direction.

9. A rotary bearing as defined in claim 7, wherein said securing element is formed as a pipe which is received in said first lubricant passage and engage in a securing depression provided on an outer periphery of said lubricant distributing element, said securing depression having a bottom surface with a supply opening which leads to an inner space of said lubricant distributing element.

10. A rotary bearing as defined in claim 1, wherein said lubricant distributing element is formed as a lubricant distributing ring.

11. A rotary bearing as defined in claim 1, wherein said radially inner bearing part has two bearing part bodies with axial end surfaces abutting against one another.

12. A rotary bearing as defined in claim 11, wherein said both bearing bodies are formed identically and arranged mirror-symmetrically.

13. A rotary bearing as defined in claim 1, wherein said radially inner bearing part is provided on said inner peripheral surface with a ring groove.

14. A rotary bearing as defined in claim 13, wherein said ring groove extends substantially over a whole periphery of said inner peripheral surface of said radially inner bearing pad.

15. A rotary bearing as defined in claim 1, and further comprising a plurality of roller bodies so that the rotary bearing is formed as a roller bearing.

16. A rotary bearing as defined in claim 15, wherein said roller bodies are arranged in two rows which are spaced from one another in the axial direction.

17. A rotary bearing as defined in claim 16, wherein said rows of said roller bodies have load lines which include an acute angle with said axis, said load lines of said both roller body rows forming an O-arrangement in a section which contains said axis.

* * * * *